Jan. 25, 1966 W. H. DUDAR 3,231,317
EMERGENCY LUBRICATION SYSTEMS FOR
BEARINGS, JOURNAL BOXES, AND
THE LIKE
Filed March 28, 1963 2 Sheets-Sheet 1
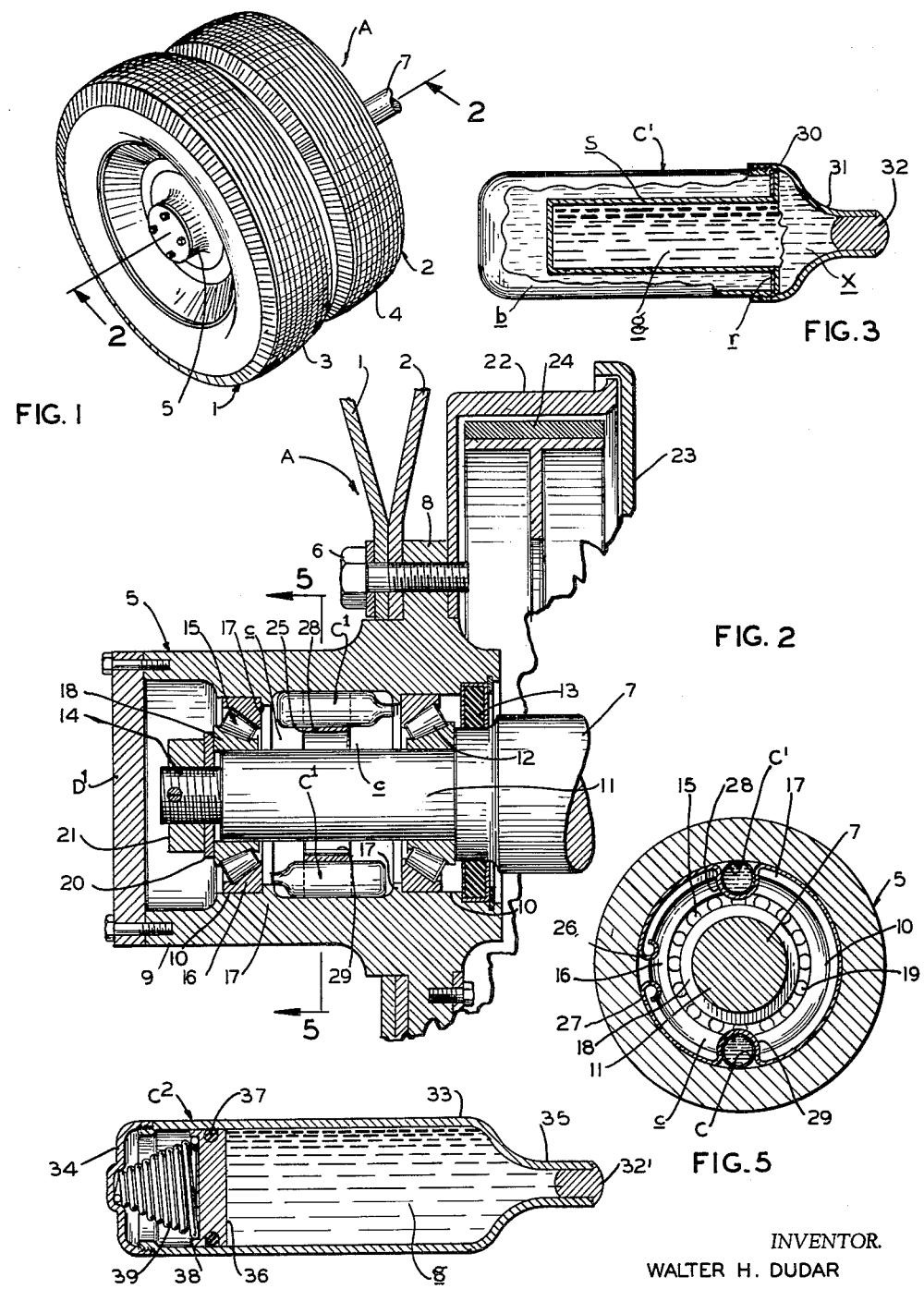
INVENTOR.
WALTER H. DUDAR
BY
ATTORNEY

INVENTOR.
WALTER H. DUDAR
BY
ATTORNEY

3,231,317
EMERGENCY LUBRICATION SYSTEMS FOR BEARINGS, JOURNAL BOXES, AND THE LIKE
Walter H. Dudar, 1227 Levee St., Dallas 7, Tex.
Filed Mar. 28, 1963, Ser. No. 268,670
6 Claims. (Cl. 308—1)

This invention relates in general to certain new and useful improvements in lubricating systems and, more particularly, to a device for automatically lubricating bearings, journal boxes, and the like, in the event of emergency circumstances.

In many types of bearing structures, such as the axle bearings of trucks, for example, it is usually rather difficult and sometimes impossible to determine when the bearings are in need of lubrication. Usually, the driver of the vehicle is warned of the need for repacking the bearings by a rather high-pitched howl generated in the wheel bearings. However, this audible indication is usually not apparent until the damage to the bearings has already occurred. Therefore, it is necessary for the wheel assembly to be disassembled, and the bearings overhauled. This, of course, is a rather time-consuming, laborious, and expensive operation.

This problem is usually accentuated in the case of large tractor-trailers, inasmuch as such vehicles employ a large number of heavy duty tires which inherently give off a dull howl or high-pitched rolling sound when in movement which completely drowns out any audible indication of wear in the bearings. Therefore, the driver of the tractor-trailer usually does not know that the wheel bearings need repacking until extensive damage has occurred.

It is, therefore, the primary object of the present invention to provide a lubricating system which will automatically lubricate the axle bearings when the latter are in need of lubrication.

It is another object of the present invention to provide a lubricating system of the type stated which is quite sensitive and will rapidly respond to a temperature rise in the bearings.

It is an additional object of the present invention to provide a lubricating system of the type stated which is adapted for use on dual tire assemblies.

It is a further object of the present invention to provide a lubricating system of the type stated which is inexpensive to manufacture and which is relatively easy to install on existing vehicles.

With the above and other objects in view, my invention resides in the novel features of form, construction, arrangement, and combination of parts presently described and pointed out in the claims.

In the accompanying drawings (two sheets):

FIG. 1 is a fragmentary perspective view of a dual tire and wheel assembly having mounted thereon an emergency axle lubricating system constructed in accordance with and embodying the present invention;

FIG. 2 is a fragmentary vertical sectional view taken along line 2—2 of FIG. 1;

FIG. 3 is a perspective view of a lubricant container forming part of the present invention;

FIG. 4 is a sectional view of a modified form of lubricant container constructed in accordance with and embodying the present invention;

FIG. 5 is a transverse sectional view taken along line 5—5 of FIG. 2;

Figure 7:
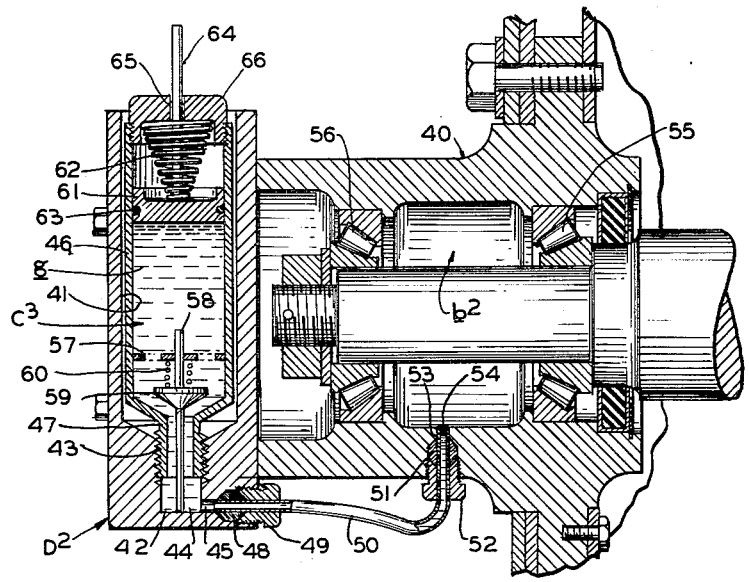
FIG. 7 is a fragmentary sectional view taken along line 7—7 of FIG. 6.
Figure 6:
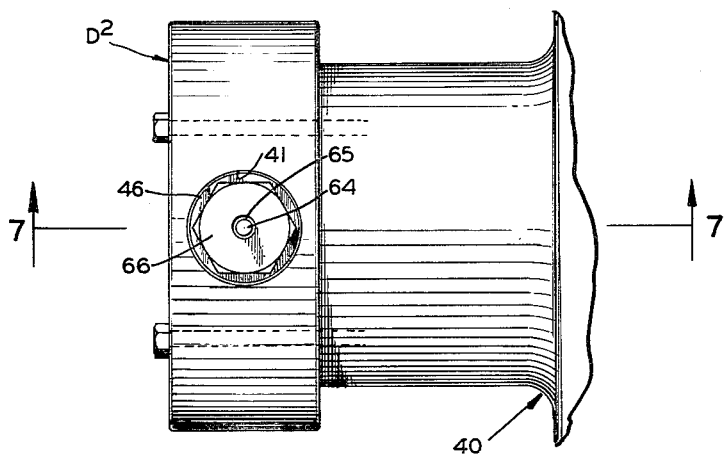
FIG. 6 is a top plan view of another modified form of lubricating system constructed in accordance with and embodying the present invention.

Generally speaking, the present invention consists of a pressurized container of lubricating grease which is capable of being mounted in the interior space within the hub of a wheel. The container includes a terminal end which is disposed in proximate relation to the wheel bearings and is sealed by a plug made of some material that is capable of softening or melting upon a rise in temperature. Thus, if the temperature of the bearings begins to rise, as will inevitably result whenever lubrication becomes deficient, the fused end of the tube will open and the lubricant in the container will be propelled into the area surrounding the bearings. A unique indicating system is also preferably employed for notifying the driver of the vehicle that the container has been discharged.

Referring now in more detail and by reference characters to the drawings, which illustrate practical embodiments of the present invention, A designates a dual wheel assembly including a pair of tandem wheels 1, 2, each being provided with tires 3, 4. The wheels 1, 2, are secured to an axle hub 5 through a plurality of circumferentially spaced bolts 6, the axle hub 5 being rotatably mounted on a stationary axle spindle 7. The hub 5 includes a flange plate 8 which integrally merges into an outwardly extending concentric boss 9. Internally the hub 5 is provided with axial bores 10 and an internal lubricant chamber $c$ which, during operative use, is preferably filled with a lubricant.

The axle spindle 7 is provided with a diametrally reduced portion 11 which is journaled in a tapered roller-bearing 12, the latter being fitted within the inwardly presented bore 10, and also mounted on the reduced portion 11 is an annular sealing ring 13 which holds the lubricant in the chamber $c$. The diametrally reduced portion 11 integrally merges into a threaded forward end 14. Fitted within the outwardly presented bore 10 is a tapered roller bearing 15 including an outer race 16 which is retained by shoulders 17 formed in the bore 10 the hub 5, and an inner race 18, which retains tapered rollers 19. The tapered roller bearing 15 is retained by means of a washer 20 and a lock nut 21 which engages the threads of threaded end 14. A dust plate or closure disk $D^1$ is bolted across the end face of the hub 5, all as best seen in FIG. 2.

The hub 5 is conventionally provided with a brake drum 22 and, similarly, the axle spindle 7 is provided with a backing plate 23, and a set of brake shoes 24. However, these latter three elements are conventional in construction, and, therefore, are not described in detail herein.

The emergency lubrication system of the present invention comprises a circular spring metal clamp-ring 25 in the form of a split circle having a pair of terminal ears 26, 27, which serve as hand grips. The clamp-ring 25 is inserted in the lubricant chamber $c$ and snugly engages the internal wall thereof. The clamp-ring 25 is also provided with a pair of diametrally opposed inwardly presented arcuate loops 28, 29, for snugly retaining a pair of identical pressurized bottle-shaped lubricant capsules or cartridges $C^1$. By reference to FIG. 2, it can be seen that the loops 28, 29, are of the same diametral size as the cartridges $C^1$ and hold the latter snugly against the internal wall of the chamber $c$.

The cartridges $C^1$ include a body portion $b$ having a cap 30 threaded on the outer end thereof. At its outer end, the cap 30 is integrally provided with an initially open diametrally reduced neck 31. Disposed within the cartridge $C^1$ across the region of threaded connection between the body portion $b$ and the cap 30 is a collar-ring $r$ which supports the annular flange of a very flexible collapsible sack $s$ filled with heavy grease $g$ such a lithium grease, fiber grease, or the like. When the grease-filled sack $s$ is set in place as shown in FIG. 3, and the cap 30 threaded onto the body portion $b$, a quantity X of a bright-colored dye, such as azo yellow in a somewhat viscous vehicle, is formed into the space within the cap 30 above the interface of the body of grease g.

Prior to the placement of the sack s the interior space of the body portion is charged at low temperature with an aerosol-type propellant, such as trichloro-trifluoro ethane (Freon 113) which at ordinary temperatures, remains essentially liquid and does not generate any substantial amount of pressure, but at the range of 200° F. to 225° F. will become gaseous and develop a substantial pressure. The charging and loading of the cartridge $C^1$ can be carried out by the usual techniques employed in making aerosolized packages. Thereupon, the neck 31 is sealed with a fusible plug 32 having a low melting point, that is to say, a melting point somewhat below the temperature at which dry bearings will begin to deteriorate or "burn up," so to speak. It has been found in connection with the present invention that the plugs 32 may be conveniently made of a lead alloy capable of melting at approximately 225° F. When the bearings heat up the propellant will develop pressure, the grease g and dye X will become fluid, the plugs will melt and the lubricant will be blown into the bearings.

It should be noted that the heat generated by the bearings 12, 15 will not only rupture the seal 13, but will also cause a significant temperature rise in the hub 5 and brake drum 22. The temperature rise will open up small minor cracks or crevices between abutting surfaces of the hub 5 and drum 22 and between the abutting surfaces of the boss 9 and closure disk $D^1$. Since the dye x is disposed in the forwardly presented portion of the bottles b adjacent the plugs 32, it will contact the overheated bearings 12, 15 first whereby to absorb much of the heat and experience a significant temperature rise. A significant lowering in viscosity or increased fluidity of the dye x will, of course, accompany the rise in temperature. Upon encountering the bearing 12, the dye x will at reduced viscosity flow freely therethrough past the ruptured seal 13 and into the brake drum 24 where it will be thrown outwardly by centrifugal force, ultimately finding its way out between the backing plate 23 and drum 22 and through the small crevice at the abutment of flange 8 of hub 5 and brake drum 22. Upon encountering the bearing 15, the dye x will, similarly, at reduced viscosity flow freely therethrough and will ultimately seep outwardly, aided by centrifugal force, through the small crevice at the abutment of boss 9 and the closure disk $D^1$. The grease g will thereafter enter the bearings 12, 15 and reduce the friction which, in turn, will result in a cooling thereof and, of course, the prevention of a burned out bearing or serious mishap. The dye stains will readily be noticed at a service stop in time to take corrective action.

Is desired, it is also possible to employ a modified form of cartridge $C^2$ as shown in FIG. 4, comprising a cylindrical body portion 33 threadedly provided at one end with a bottom cap 34. At the other end the body portion 33 is provided with a diametrally reduced neck 35 adapted for receiving a closure-plug 32' made of a low temperature alloy, similar to the previously described plug 32. Slidably disposed within the cylindrical body-portion 33 is a free piston 36 having an annular O-ring 37 for effecting a sliding seal against the interior surface of the body portion. On its rear face, that is, the face presented toward the bottom cap 34, the piston 36 is provided with a concentric cylindrical recess 38 for retentive engagement with one end of a heavy spiral spring 39 which is seated at its other end against the bottom cap 34. The bottom cap 34 may be removed whereupon the spring 39 and piston 36 may be removed. The closure-plug 32' is securely seated within the neck 35 and the body portion 33 filled about three-fourths full with a heavy lubricant charge g such as a grease commonly referred to in the trade as "fiber grease." Then the piston 36 is reinserted into the body portion and pushed in firmly against the body or charge of grease g. Any entrapped air will readily bleed past the O-ring. In this position, the spring 39 will extend outwardly beyond the open rear end of the body portion 33. Finally, the bottom cap 34 is placed over the protruding end of the spring 39 and pressed forcibly toward the body portion 33, compressing the spring 39 until the bottom cap 34 may be threaded securely onto the body portion 33. When the bottom cap 34 is finally in place, the body of grease g will be under considerable pressure and whenever the closure-plug 32' is melted by the heat from a "hot" bearing, the grease g will be forcibly ejected or "squirted," so to speak, into the bearing. It will be evident that the cartridges $C^2$, although initially somewhat more expensive than the cartridges $C^1$, may be recharged with grease many times and thus may be used over and over. Moreover, the cartridges $C^2$ can also be charged with a grease having a bright-colored dye which will leak out of the bearing and be visible on the outside of the wheel.

Dyes, such as axo triphenyl-methane, and diphenyl-methane dyes, which may be used for the aforementioned purposes, are not water soluble, and, therefore, will not wash off in the event that the wheel passes through a water puddle or is subjected to rain. Therefore, when the driver of the vehicle stops at the next service station, the colored dye will be readily apparent either to the driver or the service attendant, whereupon the bearings can be checked to determine what procedure may be necessary. The dyes of the type mentioned are all soluble, however, in organic solvents such as benzene or toluene and are, therefore, readily removable from the hub 5 and adjacent portions of the wheel without causing any permanent discoloration thereto.

It is possible to provide another modified form of lubrication system which is used on a vehicle hub 40 which is similar to the previously described hub 5. Bolted on the external face of the hub 40 is a dust plate or closure disk $D^2$ which is much thicker than the disk $D^1$ and is drilled from its circumferential face to provide a cylindrical bore 41 which is counterbored as at 42 and provided with an internally threaded socket 43 opening into a chamber 44 having a lateral offtake 45, the external end of which is diametrally enlarged and internally threaded for purposes presently more fully appearing.

Disposed within the cylindrical bore 41 is a lubricant container or cartridge $C^3$ comprising a cylindrical shell 46 having an outside diametral size slightly smaller than the internal size of the bore 41. At its lower end (reference being made to FIG. 7) the shell 46 is provided with a diametrally reduced neck 47 which is externally threaded to fit within the socket 43.

Secured within the offtake 45 by means of a pressure ring 48 and fitting 49 is a duct or tube 50 which is similarly secured at its other end by a pressure ring 51 and fitting 52 within an entry-duct 53 drilled into the hub 40. As will be seen from FIG. 7, the duct or tube 50 projects through the entry-duct 53 and terminates within the bearing chamber $b^2$. At such terminal end the duct or tube 50 is provided with a fusible plug 54 similar to the previously described plug 32 and is located in proximate relation to tapered roller bearings 55, 56.

The shell 46 is provided upwardly from the neck 47 with a rigidly fixed cross-spider 57 for slidably supporting a co-axial rod 58 integrally provided on its lower end with a poppet or check-valve 59 adapted to seat within the neck 47 and being biased into seated position by a spring 60. The rod 58 extends downwardly beyond the poppet 59 and outwardly below the neck 47 for purposes presently more fully appearing. Slidably disposed within the shell 46 is a piston or plunger 61 which is, in turn, actuated by a compression spring 62, the latter being interposed between the rearward face of the piston 61 and the inner face of the lower end of the shell 46, reference being made to FIG. 7. The shell 46 is filled or charged, as will be presently more fully discussed, with a body of grease g so that when the plug 54 melts, the piston 61 will be driven in a direction toward the neck 47 and will force the grease g out through the tube or duct 50. The piston 61 is preferably provided with an annular sealing or O-ring 63. Disposed within and extending axially through the spring 62 is a piston rod 64 which is secured to the rear face of the piston 61 and extends through an aperture 65 in a removable closure plug 66 threadedly seated in the outer end of the shell 46, in the manner as shown in FIG. 7. It should be noted that the aperture 65 is slightly larger in diameter than the diametral cross-section of the piston rod 64 so that it, in effect, provides a means for venting the space to the rear of the piston 61 so that air in this space will not interfere with movement of the piston 61 in either direction.

When either of the roller bearings 55, 56, heat up through a lack of sufficient lubricant, the hub 40 will immediately increase in temperature. If the heat absorbed by the hub 40 causes a temperature rise to at least 215° F., the grease g will become less viscous and also the plug 54 will melt. The grease g will then be forced out through the action of the piston 61, and will be injected into the bearings 55, 56. This emergency lubrication is sufficient to prevent undue wear for a period of time. After the plug 54 has melted and the piston 61 has moved inwardly into the shell 46, the extended end of the piston rod 64 will be pulled inwardly through the aperture 65 and will no longer be visible. Thus, the driver is immediately warned that the cartridge C³ has been discharged and that the bearings 55, 56, are in need of attention. For this purpose, the extended end of the piston rod 64 should preferably be painted with a bright color for ease of visual indication.

Whenever desired, the cartridge C³ can be recharged by removing it from the bore 41. Thereupon, a new charge of grease can be injected into the shell 46 through the poppet or check-valve 59. The tube 50 can be replaced with a new tube 50 having an unmelted fusible plug 54. Then the recharged cartridge C³ may be threaded back into the socket 43, in the lower end of the cylindrical bore 41. The downwardly projecting end of the rod 58 will abut the bottom of the chamber 44, thereby opening the poppet or check-valve 59. As this occurs, the grease g in the shell 46 will pass through the duct 50, and will be retained by the plug 54.

While the emergency lubrication system has been described and illustrated for use with an automotive axle, it should be understood that the emergency lubrication system can be used with any device having a rotatable member journaled in bearings.

It should be understood that changes and modifications in the form, construction, arrangement, and combination of the several parts of the emergency lubrication systems for bearings, journal boxes, and the like, may be made and substituted for those herein shown and described without departing from the nature and principle of my invention.

Having thus described my invention, what I claim and desire to secure by Letters Patent is:

1. An emergency lubrication system for automatically lubricating the bearings including a housing in which the bearings are operatively located and in which said bearings support a rotatable member; said system comprising a container, means for removably supporting said container within said housing in proximity to the bearings, a supply of lubricant and liquid-gaseous propellant of the aerosol type under pressure in said container, and temperature-repsonsive closure means mounted in said container for normally holding the supply of propellant and lubricant in said container and being adapted to open responsive to a temperature rise in said bearings for admitting the supply of lubricant to said bearings.

2. An emergency lubrication system for automatically lubricating the bearings of an axle when dry; said system comprising a container, means for removably supporting the container within the hub of a wheel and being operatively connected to the bearings of said axle, said container having an opening therein, a supply of lubricant and liquid-gaseous propellant of the aerosol type in said container, a fusible plug in the opening of said container whereby to close said opening and hold said supply of propellant and lubricant in said container, said plug being adapted to melt open responsive to a temperature rise in said bearings for admitting the supply of lubricant to said bearings.

3. An emergency axle lubrication system for automatically lubricating the bearings of an axle when dry; said system comprising a pair of containers, means for removably supporting said containers within the hub of a wheel and being operatively connected to the bearings of said axle, each of said containers having an opening therein, a supply of lubricant in each of said containers, a fusible plug in the opening of each of said containers whereby to close said opening and hold said supply of lubricant in said containers, said plug being adapted to melt open responsive to a temperature rise in said bearings for admitting the supply of lubricant to said bearings, and a quantity of liquid-gaseous propellant of the aerosol type disposed within said containers for forcing the lubricant out of the containers into the bearings when the fusible plug is melted due to excess heat in the bearing.

4. An emergency lubrication system for automatically lubricating the bearings including a housing in which the bearings are operatively located and in which said bearings support a rotatable member; said system comprising a lubricant container, means for removably supporting said container within said housing, a tube operatively connected to said container and terminating in close proximity to said bearings, said tube being directed at said bearings, a supply of lubricant and liquid-gaseous propellant of the aerosol type in said container, said tube having a fusible element for normally holding the supply of propellant and lubricant in said container, said element being adapted to open responsive to a temperature rise in said bearings for admitting the supply of lubricant to said bearings, and dye material disposed within said container for ejection contemporaneously with said lubricant whereby to indicate when said fused end is opened.

5. An emergency lubrication system for automatically lubricating the bearings including a housing in which the bearings are operatively located and in which said bearings support a rotatable member; said system comprising a container, means for removably supporting said container within said housing in proximity to the bearings, an inner flexible element disposed within the container so as to divide the container into first and second compartments, a supply of lubricant in the first compartment, a pressurized propellant of the aerosol type in the second compartment, and temperature-responsive closure means mounted in said container for normally holding the supply of lubricant in said first compartment and being adapted to open responsive to a temperature rise in said bearings for admitting the supply of lubricant to said bearings.

6. An emergency lubrication system according to claim 5 in which the propellant is trichloro-trifluoro ethane.

References Cited by the Examiner
UNITED STATES PATENTS

| | | | |
|---|---|---|---|
| 1,155,932 | 10/1915 | Kessler. | |
| 1,451,044 | 4/1923 | Leonard | 308—1.5 |
| 2,387,301 | 10/1945 | Sanford | 308—187 |
| 2,566,494 | 9/1951 | Leese | 308—38 |

FOREIGN PATENTS 3,093  1891  Great Britain.

DON A. WAITE, *Primary Examiner.*

FRANK SUSKO, ROBERT C. RIORDON, *Examiners.*